(12) United States Patent
Graumann et al.

(10) Patent No.: US 9,902,340 B2
(45) Date of Patent: Feb. 27, 2018

(54) SYSTEMS, METHODS, AND APPARATUS FOR ENHANCING A CAMERA FIELD OF VIEW IN A VEHICLE

(75) Inventors: David L. Graumann, Portland, OR (US); Carlos R. Montesinos, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 13/977,508

(22) PCT Filed: Dec. 29, 2011

(86) PCT No.: PCT/US2011/067823
§ 371 (c)(1),
(2), (4) Date: Apr. 25, 2014

(87) PCT Pub. No.: WO2013/101049
PCT Pub. Date: Jul. 4, 2013

(65) Prior Publication Data
US 2015/0085116 A1    Mar. 26, 2015

(51) Int. Cl.
*B60R 11/04* (2006.01)
*B60R 1/02* (2006.01)
*B60R 1/12* (2006.01)

(52) U.S. Cl.
CPC .............. *B60R 11/04* (2013.01); *B60R 1/025* (2013.01); *B60R 2001/1253* (2013.01); *B60R 2300/101* (2013.01); *B60R 2300/8006* (2013.01)

(58) Field of Classification Search
None
See application file for complete search history.

(56) References Cited

U.S. PATENT DOCUMENTS

| 6,226,035 B1 | 5/2001 | Korein et al. |
| 7,364,301 B2 | 4/2008 | Scharenbroch et al. |

(Continued)

FOREIGN PATENT DOCUMENTS

| CN | 1516655 | 7/2004 |
| DE | 10110904 | 9/2002 |

(Continued)

OTHER PUBLICATIONS

Extended European Search Report for European Application No. 11878387.7 dated Sep. 8, 2015. 6 pages.

(Continued)

*Primary Examiner* — Mohammad J Rahmad
(74) *Attorney, Agent, or Firm* — Eversheds Sutherland (US) LLP

(57) ABSTRACT

Certain embodiments of the invention may include systems, methods, and apparatus for enhancing a field of view of a camera in a vehicle. According to an example embodiment of the invention, a method is provided for executing computer executable instructions by one or more processors for enhancing a field of view associated with a camera in a vehicle. The method includes capturing image information from one or more objects or one or more occupants in the vehicle; processing the image information; receiving trigger information associated with one or more of the image information, the one or more objects, or the one or more occupants associated with the vehicle; configuring one or more reflective surfaces, based at least in part on the received trigger information, wherein configuring comprises positioning the one or more reflective surfaces with respect to the camera field of view; and adjusting the position of the one or more reflective surfaces based at least on the processing of the image information.

6 Claims, 5 Drawing Sheets

(56) References Cited

U.S. PATENT DOCUMENTS

| | | | |
|---|---|---|---|
| 9,302,679 B2* | 4/2016 | Graumann | G06F 3/0202 |
| 9,517,776 B2* | 12/2016 | Graumann | B60W 50/08 |
| 2003/0098909 A1 | 5/2003 | Fritzsche et al. | |
| 2003/0107789 A1* | 6/2003 | Hishioka | G02B 3/14 |
| | | | 359/223.1 |
| 2004/0090334 A1* | 5/2004 | Zhang | G08B 21/06 |
| | | | 340/575 |
| 2004/0150741 A1* | 8/2004 | Togawa | H04N 5/23212 |
| | | | 348/345 |
| 2004/0240078 A1* | 12/2004 | Sekiyama | G02B 7/08 |
| | | | 359/726 |
| 2005/0030438 A1* | 2/2005 | Nishioka | G02B 26/0825 |
| | | | 349/21 |
| 2005/0100191 A1* | 5/2005 | Harbach | A61B 3/145 |
| | | | 382/103 |
| 2005/0200984 A1* | 9/2005 | Browne | B60R 1/08 |
| | | | 359/846 |
| 2006/0092534 A1 | 5/2006 | Ivanov | |
| 2006/0125919 A1* | 6/2006 | Camilleri | B60R 1/00 |
| | | | 348/148 |
| 2006/0132604 A1* | 6/2006 | Lao | G08B 13/19647 |
| | | | 348/148 |
| 2007/0289799 A1* | 12/2007 | Aoki | B60N 2/002 |
| | | | 180/271 |
| 2007/0289800 A1* | 12/2007 | Aoki | G06K 9/00369 |
| | | | 180/273 |
| 2008/0021616 A1* | 1/2008 | Aoki | G06K 9/00201 |
| | | | 701/45 |
| 2009/0243824 A1* | 10/2009 | Peterson | B60R 1/12 |
| | | | 340/435 |
| 2011/0063446 A1* | 3/2011 | McMordie | G06K 9/00255 |
| | | | 348/159 |
| 2012/0078469 A1* | 3/2012 | Karner | B29C 45/0017 |
| | | | 701/36 |
| 2014/0348389 A1* | 11/2014 | Graumann | B60W 50/08 |
| | | | 382/104 |
| 2015/0158501 A1* | 6/2015 | Graumann | G06F 3/0202 |
| | | | 701/49 |

FOREIGN PATENT DOCUMENTS

| | | |
|---|---|---|
| DE | 102008019732 | 10/2009 |
| DE | 102009027512 | 1/2011 |
| DE | 102010003666 | 10/2011 |
| EP | 2218606 | 8/2010 |
| JP | 2011109634 | 6/2011 |
| KR | 20-1998-0048812 U | 10/1998 |
| WO | 02062623 | 8/2002 |
| WO | 2013/101049 A1 | 7/2013 |

OTHER PUBLICATIONS

Office Action for Chinese Patent Application No. 201180075945.4 dated Dec. 7, 2015. 11 pages Chinese Office Action, English translation not available.

International Search Report and Written Opinion received for PCT Application No. PCT/US2011/067823, dated Sep. 21, 2012, 8 pages.

International Preliminary Report on Patentability and Written Opinion received for PCT Patent Application No. PCT/US2011/067823, dated Jul. 10, 2014, 5 pages.

Office Action from Chinese Application No. 201180075945.4 dated Jul. 12, 2016. (26 pgs., including 15 pgs. translation).

Office Action for European Application No. EP11878387.7, dated Nov. 24, 2016, 4 pages.

Office Action for Chinese Application No. 201180075945.4, dated Dec. 30, 2016, 6 pages (3 pages English translation).

Office Action for European Application No. 11878387.7, dated Oct. 26, 2017, 4 pages.

* cited by examiner

SYSTEMS, METHODS, AND APPARATUS FOR ENHANCING A CAMERA FIELD OF VIEW IN A VEHICLE

FIELD OF THE INVENTION

This invention generally relates to imaging portions of a vehicle with a camera, and in particular, to systems, methods, and apparatus for enhancing a field of view of the camera.

BACKGROUND OF THE INVENTION

Automobile manufacturers rely on a number of in-cabin sensors and controls for receiving input from occupants of a vehicle and/or measuring aspects associated with the vehicle. In-cabin cameras may be used as sensors, for example, to gather information about items or occupants in the vehicle. In certain cases, the use of in-vehicle cameras can be used to simplify wiring harnesses, reduce bulk, increase reliability, and decrease manufacturing costs. But the in-vehicle cameras may be restricted in number and/or placement locations within the vehicle due to practical or cost constraints. By limiting the number or placement of cameras in the vehicle, the usable field of view may be limited to certain portions of the vehicle cabin.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
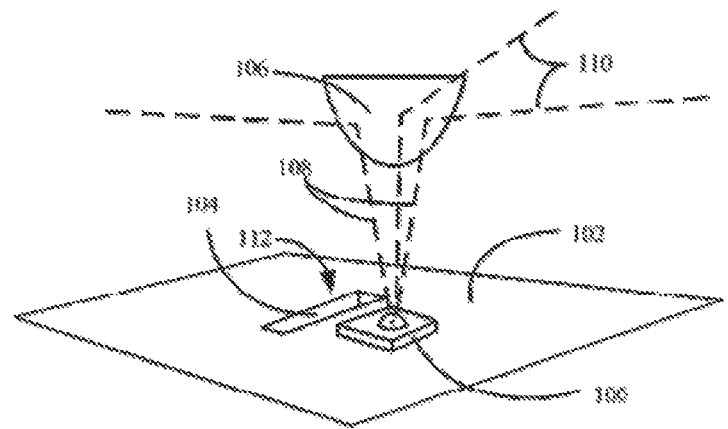
FIG. 1A is a diagram of an illustrative camera having a field of view expanded by a dome mirror, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description, references to "mirror," are generally used to refer to at least a specular surface, and may be interchangeable with "reflector," "reflective element," "reflective surface," etc. According to example embodiments of the invention, the specular surface may be flat, shaped, domed, distorted, curved, etc. According to certain example embodiments, the term "mirror" may refer to one or more reflective elements.

Certain embodiments of the invention may enable a fixed-position camera to have an associated field-of-view modified, redirected, or extended by the selective addition or removal of one or more mirrors in the path of the field of view of the camera. According to an example embodiment, the one or more mirrors may be selectively engaged so that images from a certain part of a vehicle are reflected into the field of view of the camera. In another embodiment, the one or more mirrors may be disengaged or retracted so that there is a clear field-of-view path for imaging other parts of the vehicle. According to another example embodiment, the one or more mirrors may be selectively engaged so that images from a certain part of a vehicle are reflected into the field-of-view of the camera for imaging, while part of the field-of-view of the camera is unobstructed by the mirror. In this example embodiment, different regions of a vehicle may be imaged simultaneously.

According to example embodiments of the invention, the position, tilt, rotation, attitude, curvature, distortion or a combination thereof, of the mirror may be selectively changed for accessing different views associated with the vehicle. According to example embodiments, one or more servomotors, actuators, solenoids, electrostatic elements, etc., may be utilized to selectively control the position, tilt, rotation, attitude, curvature or distortion of the mirror. According to an example embodiment, the proximity of the mirror to the camera may be selectively modified. According to an example embodiment, a camera may have an acceptance angle associated with its field-of-view, and a small diameter mirror placed near the camera aperture may be utilized to redirect at least a portion (if not all of) the camera's field-of-view. According to an example embodiment, a diameter associated with the mirror may need to be increased as the distance increases between the camera aperture and the mirror. According to certain example embodiments, it may me advantageous in terms of weight, bulk, and space to utilize small mirrors placed close to the camera aperture for redirecting the field-of-view In accordance with certain example embodiments, mirrors may interact with, or may be attached to one or more actuators. According to example embodiments, the actuators may be selectively engaged to position, place, or adjust certain aspects of the mirror. According to example embodiments, the actuators may be utilized to position, place, or adjust the mirror with respect to the field-of-view of the camera. In example embodiments, the actuators may be utilized for selectively disengaging to alter or remove the relative placement or shape of the mirror with respect to the camera field-of-view. According to example embodiments, the actuators may provide certain controlled actuation movements for positioning the mirror, including linear translation, rotation, tilt, and attitude.

According to example embodiments, the mirror may be deformable. For example, the mirror may be flat in one mode, and curved in another mode. According to example embodiments, the actuators and mirrors may be designed to selectively modify the shape, deformation, curvature, etc., associated with the mirror. For example, an actuator may be configured to selectively bend a portion of the mirror or substrate upon which a flexible mirror surface is attached.

According to an example embodiment, a camera may be placed in or near the vehicle console and may be configured to view a driver head and torso. In an example embodiment, with the addition of a mirror properly positioned, the camera field-of-view may be extended to include one or more passengers, for example. By controlling the position of the mirror, the field-of-view may be further extended to include image information from outside of the vehicle. But certain areas of interest within or outside of the vehicle may still be blocked due to certain objects obstructing the view. According to an example embodiment, two or more mirrors may be selectively positioned and utilized in combination for accessing views that may not normally be in the line-of-sight of the camera or the camera and single mirror combination.

Various components and geometries may be utilized for selectively redirecting or extending a field-of-view of a camera, according to example embodiments of the invention, and will now be described with reference to the accompanying figures.

FIG. 1A illustrates a camera 100 with a normal field-of-view 108 expanded to an extended field-of-view 110 by a dome mirror 106, according to an example embodiment of the invention. In an example embodiment, the camera 100 may be mounted or attached to a portion of a vehicle, for example, on the console or dash 102. According to example embodiments, the camera 100 may be placed in any convenient location anywhere in the vehicle. According to an example embodiment, the dome mirror 106 may be attached to the vehicle, for example, on the underside of a rear view mirror, on a window, on or near the cabin headliner, or in any convenient location on the vehicle. According to an example embodiment, the camera and mirror combination may be rotated, translated, etc., for any convenient placement within the vehicle without departing from example embodiments. According to example embodiments, the camera and associated mirrors may be placed inside the cabin compartment of the vehicle. In other example embodiments, the camera, the mirror(s), or both the camera and mirror(s) may be placed on the vehicle outside the cabin compartment.

According to example embodiments, the dome mirror 106 may provide a particular "fisheye." or warped view of the vehicle cabin for imaging by the camera 100. For example, the dome mirror 106 may provide a 360-degree view. In an example embodiment, the view may include image information inside and/or outside the vehicle. In this example embodiment, additional information that would normally be outside of the view of the camera 100 alone may be available for imaging by the camera 100. According to example embodiments, images captured by the camera 100 may be processed, transformed, un-warped, etc., to obtain information from a region of interest.

Figure 1B:
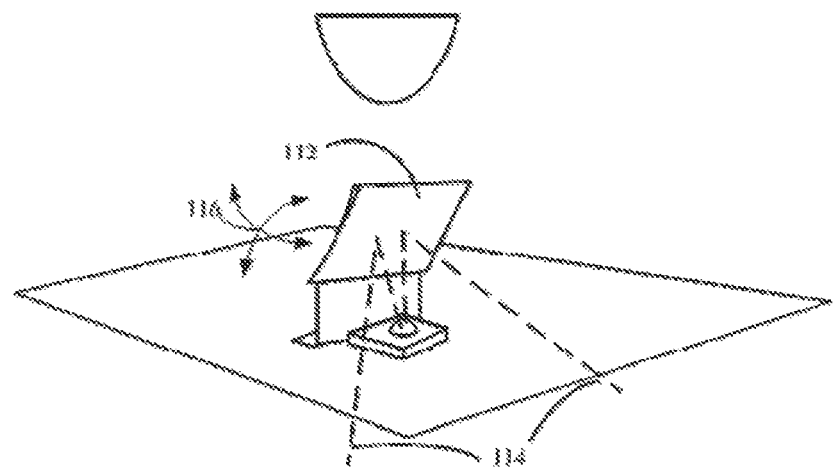
FIG. 1B is a diagram of the illustrative camera of FIG. 1A with the field of view modified by a redirecting mirror, according to an example embodiment of the invention.

FIG. 1A also depicts an example slot 104 for housing a redirecting mirror 112, depicted in this figure in a retracted position. FIG. 1B depicts the redirecting mirror 112 in an engaged or alternate position. According to an example embodiment, the redirecting mirror 112 may be selectively engaged, tilted 116, warped, etc. to select a desirable redirected field-of-view 114.

Figure 2:
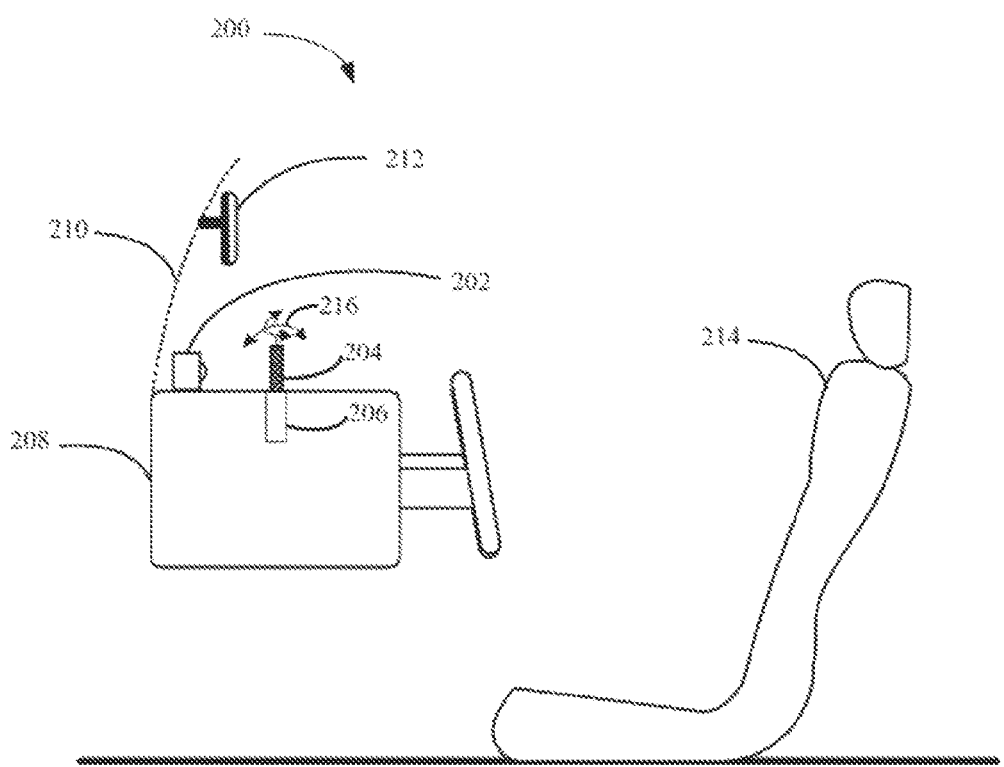
FIG. 2 is a diagram of vehicle side view with an illustrative cabin-facing camera having a field of view modified by a reflective surface, according to an example embodiment of the invention.

FIG. 2 is a diagram of vehicle side view 200 with an illustrative cabin-facing camera 202 having a field-of-view that may be modified, enhanced, or extended by a redirecting mirror 204, according to an example embodiment of the invention. In an example embodiment, the redirecting mirror 204 may be configured to selectively engage (as shown) or to retract into a cavity 206 via one or more actuators. According to example embodiments, the camera 202 and actuators associated with the redirecting mirror 204 may be placed in the console near convenient locations for access to wiring, power, etc. According to an example embodiment, one or more actuators may be utilized for tilting or rotating 216 the redirecting mirror 204. For example, the redirecting mirror may be tilted or rotated 216 to adjust a redirected field-of-view of the camera 202.

According to an example embodiment, the redirecting mirror 204 may be translated to only partially interact with a field-of-view of the camera 202. In this example embodiment, the redirecting mirror 204 may provide a partial redirection of the field-of-view, while other parts of the field-of-view may remain within the line-of-sight of the camera without redirection by the redirecting mirror 204. According to example embodiments, the redirecting mirror 204 may be tilted or rotated 216 completely out of the way of a normal field-of-view associated with the camera 202.

According to example embodiments, one or more of the camera 202, redirecting mirror 204, or cavity 206 may be attached to a dash 208 or other convenient locations associated with a vehicle. In an example embodiment, a rear view mirror 212 may be attached to a windshield 210, for example, and may include additional redirecting mirrors for obtaining extended or expanded images associated with the vehicle. For example, as depicted previously in FIGS. 1A and 1B, the rear view mirror 212 may include a dome mirror or other mirror surface that could be used in conjunction with the tilted 216 redirecting mirror 204 to provide additional extended views of the vehicle cabin. Similar to the redirecting mirror 204, the rear view mirror may be selectively arranged, tilted, warped, etc., for coordination with the redirecting mirror 204. According to an example embodiment, the redirecting mirror 204 may be engaged and/or tilted 216 to obtain images outside of the vehicle. According to an example embodiment, the redirecting mirror 204 may be retracted into the cavity 206 and/or tilted 216 to obtain images inside the vehicle, for example, regions of interest associated with or near a passenger seat 214. According to an example embodiment, the redirecting mirror 204 may be configured to image portions outside of the vehicle when the vehicle is parked and there are no occupants of the vehicle. According to an example embodiment, certain triggers, such as a door opening, a weight sensor, a key fob, an ignition switch, gestures by the occupant etc., be utilized to modify the position, tilt, retraction, bending, warping, etc., of the redirecting mirror 204 or any other associated reflection surface. According to example embodiments, the redirecting mirror 204 may be selectively altered in response to various triggers for switching views from the outside the vehicle to inside the vehicle, or for switching among any views available.

Figure 3:
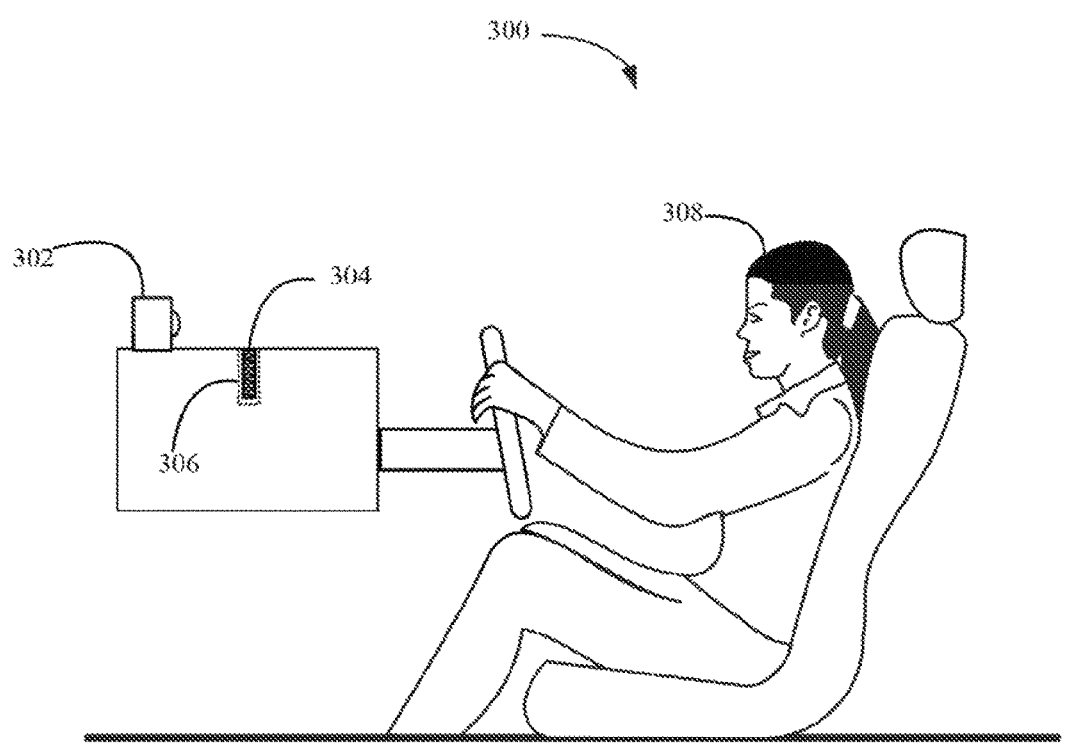
FIG. 3 is a diagram of a vehicle side view with illustrative cabin-facing camera and a retracted modified reflective surface, according to an example embodiment of the invention.

FIG. 3 is an illustrative diagram of a vehicle side view 300 with a cabin-facing camera 302 (which may correspond to the camera 202 of FIG. 2) and a retracted redirecting mirror 304 (which may correspond to the redirecting mirror 204 of FIG. 2). According to an example embodiment of the invention, and as mentioned above, sensors may be located in vehicle, for example, to detect the presence of an occupant 308. According to an example embodiment, the cabin-facing camera 302 may image portions of the vehicle cabin interior. According to example embodiments, the images may be processed or analyzed to obtain information associated with one or more occupants 308 of the vehicle or any item, control, etc., associated with the vehicle including, but not limited to, physical features, hand position(s), steering wheel position(s), seat position, safety belt position, pedal position, personal items, control settings, passengers, vehicle contents, vehicle settings, etc.

Figure 4:
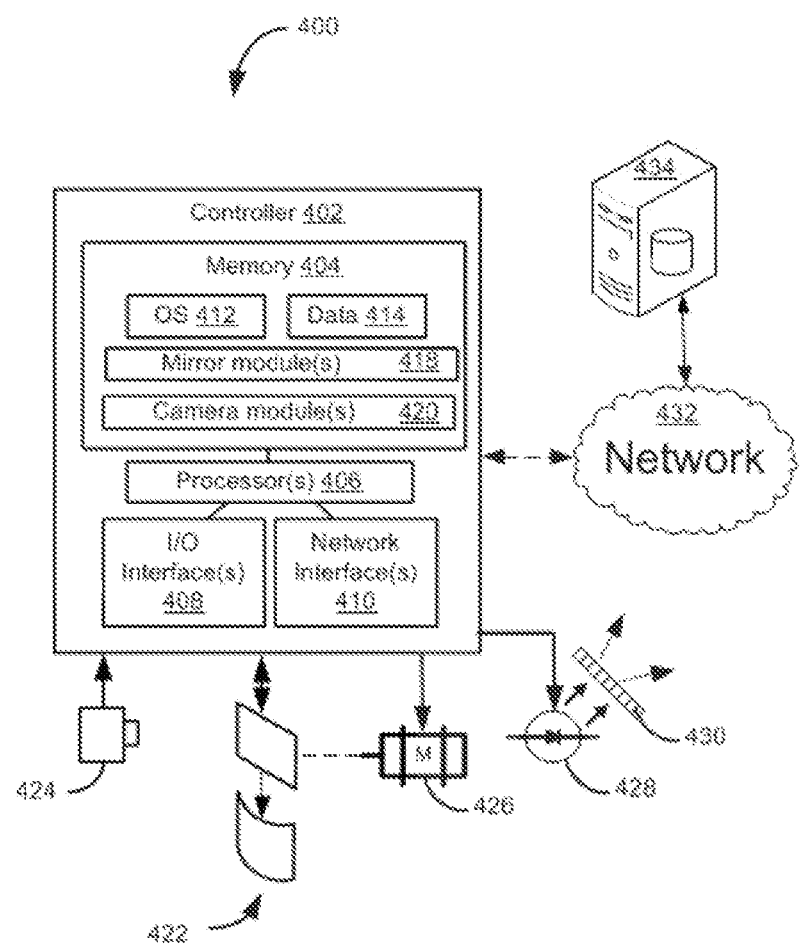
FIG. 4 is a block diagram of an illustrative camera field of view modification system, according to an example embodiment of the invention.

FIG. 4 is a block diagram of an illustrative camera field-of-view modification system 400, according to an example embodiment of the invention. The system 400 includes a controller 402 in communication with one or more cameras 424, and one or more actuators 426 for positioning or configuring one or more mirrors 422 with respect to the one or more cameras 424. According to an example embodiment, the controller 402 may include one or more processors 406, and one or more input/output interfaces 408. According to an example embodiment, the one or more input/output interfaces may be utilized for communication with the one or more cameras 424 and/or the one or more actuators 426. According to example embodiments, the one or more actuators 426 may include servo controls, and/or actuation feedback for position verification and/or adjustment for rough or fine positioning of the one or more mirrors 422.

According to an example embodiment, the memory 404 may include an operating system 412 and data 414. In an example embodiment, the memory 404 may include a mirror module 418 that may be utilized for positioning or configuring the mirrors 422 via the one or more actuators 426. According to example embodiments, the one or more actuators 426 may include an electrostatic transducer, magnetic, electrostatic charge, linear motor, solenoid, DC motor, air-driven motor, or any device that can configure the one or more mirrors. In example embodiments, configuring the one or more mirrors can include linear translation, rotation, tilting, scanning, etc.

According to an example embodiment, the memory may include one or more camera modules 420 for controlling the camera 424, receiving images, processing the images, and/or extracting information from image information.

In accordance with an example embodiment, the controller 402 may include one or more network interfaces 410, for communicating with a remote device 434 via a wireless network 432. For example, image information captured by the one or more cameras 424 or information associated with the image information, may be communicated to a remote device 434, for example, a computer, web server, mobile computing device, etc. At the remote device 434, or a device in communication with the remote device 434, the image information or information associated with the image information can be stored, further processed, or viewed so that an owner may view the contents or surroundings of the vehicle from a remote location. According to another example embodiment, a vehicle owner (or other associated entity having access rights) may use such a system for visual verification of the occupants, or to capture and transmit one or more images inside or outside of the vehicle. According to example embodiments, law enforcement or other authorized entities may utilize such a system to capture an image of a thief if the car is stolen.

According to an example embodiment, the camera module 420 may be utilized for determining depth information associated with images captured by the one or more cameras 424. According to an example embodiment, the controller 402 may be utilized to control one or more light source 428, for example, to illuminate occupants or objects in the vehicle with structured light. For example, a known pattern of light may be generated from the light source 428 by transmitting the light through a diffraction grating or holographic element 430. In accordance with example embodiments, the resulting light pattern may be projected onto occupants or objects in the vehicle. According to another example embodiment, the resulting light pattern may be projected the objects outside of the vehicle. According to example embodiments, the light source 428 may include a light emitting diode, a laser diode, etc. According to example embodiments, the light source 428 may emit wavelengths that are visible to the camera 424, including eye-safe infra-red, near infra-red, visible, or ultra-violet. According to example embodiment, the light source 428 may be pulsed (for example according to a multiple of a frame-rate associated with the camera 424) to further aid in detection of the projected image.

According to an example embodiment, the one or more cameras 424 may capture images to determine depth information associated with one or more objects or people upon which the structured light is projected. For example the camera module 420 may be utilized to process images and detect shapes or relative spacing of features associated with the projected structured light. According to an example embodiment, the structured light may be designed with a known pattern and fan-out angle, for example, by selecting the wavelength of light from the light source 428 and/or the refractive index and/or optical density profile of the diffraction grating or holographic element 430. According to example embodiments, projected features associated with the structured light may be sized or spaced relative to distance between the diffraction grating or holographic element 430 and the one or more objects or people upon which the structured light is projected. According an example embodiment, depth information may be obtained by analyzing, for example with the one or more processors 406, the size or spacing of the projected features.

According to example embodiments, the depth information may be obtained, for example, to determine a position of an occupant's head or upper body. Such information may be useful, for example, for placing the position or tilt angle of a mirror in the proper location with respect to the object or occupant of interest. For example, the mirror placement or position of the mirror tilt angle may adjusted, based at least in part, on information determined from the processed structured light image so that the field-of-view can be adjusted. According to an example embodiment, the mirror may be adjusted for optimum (or near optimum) utilization of the field-of-view. For example, a camera may have a limited number of pixels associated with its field-of-view, and according to an example embodiment, an image associated with a particular region of interest may have its the full (or near full) resolution utilized by controlling the combination of the camera and the mirror(s) so that the region of interest takes up as much of the field-of-view as practically possible.

Figure 5:
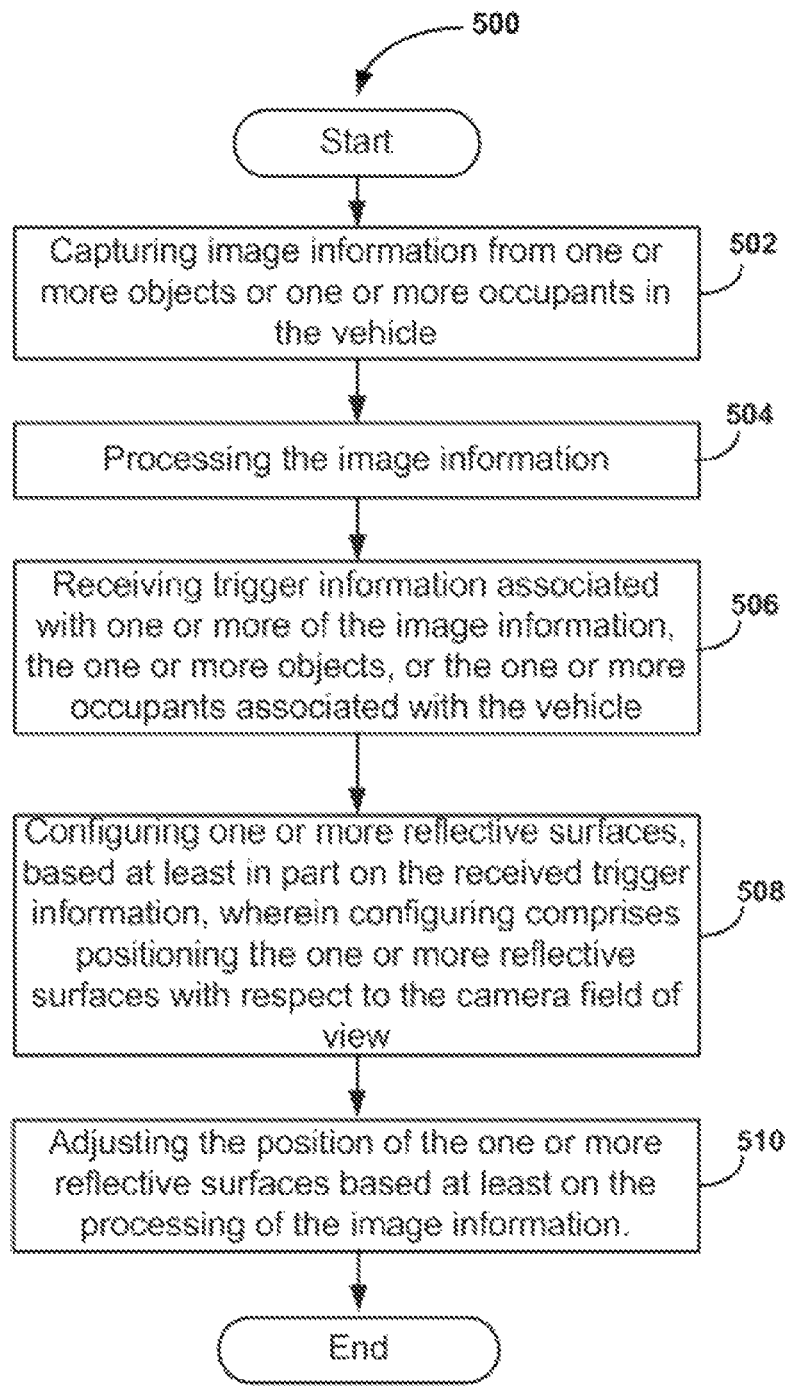
FIG. 5 is a method flow diagram, according to an example embodiment of the invention.

An example method 500 for enhancing a field of view associated with a camera in a vehicle will now be described with reference to the flowchart of FIG. 5. The method 500 starts in block 502, and according to an example embodiment of the invention includes capturing image information from one or more objects or one or more occupants in the vehicle. In block 504, the method 500 includes processing the image information. In block 506, the method 500 includes receiving trigger information associated with one or more of the image information, the one or more objects, or the one or more occupants associated with the vehicle. In block 508, the method 500 includes configuring one or more reflective surfaces, based at least in part on the received trigger information, wherein configuring comprises positioning the one or more reflective surfaces with respect to the camera field of view. In block 510, the method 500 includes adjusting the position of the one or more reflective surfaces based at least on the processing of the image information. The method 500 ends after block 510.

According to example embodiments, the trigger information may be based on events or timing associated with the vehicle, actions or events associated with the one or more occupants, and/or information associated with the image. For example, a camera may be positioned to capture images of items or occupants inside the vehicle while in use, but after the occupant leaves the vehicle and locks the door, for example, the camera's field of view may scan the cabin for any items left behind, and if nothing is detected, then the field of view may be switched for monitoring events outside of the car. In this illustrative example, the act of locking the car may provide trigger information for positioning the mirrors with respect to the camera for scanning seats, etc. This example also depicts how the trigger information may be based on information in the image.

Example embodiments may include adjusting a focus associated with the camera based at least on the processing of the image information. Example embodiments may include transforming the image information based at least in part on a shape associated with the one or more reflective surfaces. Example embodiments may include adjusting a shape of the one or more reflective surfaces. Example embodiments may include projecting a pattern onto the one or more objects or occupants. Capturing the image information may include imaging at least a portion of the projected pattern. The projecting a pattern may include structured light pattern.

Example embodiments may include moving or rotating at least one of the one or more mirrors or reflective surfaces to alter the field of view associated with the camera. According to example embodiments, the mirrors may include shapes, profiles, bends, etc. According to example embodiments, the mirror may be a dome, a cylinder, a multi-angular reflective array, or a complex shape.

According to example embodiments, certain technical effects can be provided, such as creating certain systems, methods, and apparatus that can selectively extend, expand or enhance a field-of-view of a camera. Example embodiments of the invention can provide the further technical effects of providing systems and methods for utilizing a single camera to selectively view more than one region associated with a vehicle.

In example embodiments of the invention, the camera field-of-view modification system 400 may include any number of hardware and/or software applications that are executed to facilitate any of the operations. In example embodiments, one or more input/output interfaces may facilitate communication between the camera field-of-view modification system 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the camera field-of-view modification system 400. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the camera field-of-view modification system 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the camera field-of-view modification system 400 with more or less of the components illustrated in FIG. 4.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising executing computer executable instructions by one or more processors for enhancing a camera field of view in a vehicle, the method further comprising:
   capturing image information from one or more objects or one or more occupants in the vehicle;
   processing the image information;
   receiving trigger information associated with one or more of the image information, the one or more objects, or the one or more occupants associated with the vehicle;
   configuring first one or more reflective surfaces, based at least in part on the trigger information, wherein configuring comprises positioning the first one or more reflective surfaces with respect to the camera field of view; and
   adjusting a position and a shape of the first one or more reflective surfaces based at least on the processing of the image information and a position of a second one or more reflective surfaces with respect to the camera field of view; and
   adjusting a focus associated with the camera based on the adjusted position and shape of the first one or more reflective surfaces.

2. A vehicle comprising:
   at least one camera;
   first one or more reflective surfaces, wherein the first one or more reflective surfaces are dynamically configurable;
   second one or more reflective surfaces, wherein the second one or more reflective surfaces are dynamically configurable;
   at least one memory for storing data and computer-executable instructions; and
   one or more processors configured to access the at least one memory and further configured to execute computer executable instructions for:
   capturing image information from one or more objects or one or more occupants associated with the vehicle;
   processing the image information;
   identifying trigger information associated with one or more of the image information, the one or more objects, or the one or more occupants associated with the vehicle;
   configuring the first one or more reflective surfaces, based at least in part on the trigger information, wherein configuring comprises positioning the first one or more reflective surfaces with respect to at least one camera field of view;
   adjusting a position and a shape of the first one or more reflective surfaces based at least on the processing of the image information and a position of a second one or more reflective surfaces with respect to the at least one camera field of view; and
   adjusting a focus associated with the camera based on the adjusted position and shape of the first one or more reflective surfaces.

3. The vehicle of claim 2, wherein the first one or more reflective surfaces comprise at least a portion of one or more of: a dome, cylinder, a multi-angular reflective array; or a complex shape.

4. An apparatus comprising:
   at least one memory for storing data and computer-executable instructions; and
   one or more processors configured to access the at least one memory and further configured to execute computer executable instructions for:
   capturing image information from one or more objects or one or more occupants associated with a vehicle;
   processing the image information;
   identifying trigger information associated with one or more of the image information, the one or more objects, or the one or more occupants associated with the vehicle;
   configuring first one or more reflective surfaces, based at least in part on the trigger information, wherein configuring comprises positioning the first one or more reflective surfaces with respect to a field of view of a camera;
   adjusting a position and a shape of the first one or more reflective surfaces based at least on the processing of the image information and a position of a second one or more reflective surfaces with respect to the field of view of the camera; and
   adjusting a focus associated with the camera based on the adjusted position and shape of the first one or more reflective surfaces.

5. The apparatus of claim 4, wherein the first one or more reflective surfaces comprise at least a portion of one or more of: a dome, cylinder, a multi-angular reflective array; or a complex shape.

6. A non-transitory computer-readable medium storing computer-executable instructions which, when executed by a processor, cause the processor to perform operations comprising:
   causing to capture image information from one or more objects or one or more occupants associated with a vehicle;
   processing the image information;
   identifying trigger information associated with one or more of the image information, the one or more objects, or the one or more occupants associated with the vehicle;

causing to configure first one or more reflective surfaces, based at least in part on the trigger information, wherein configuring comprises positioning the first one or more reflective surfaces with respect to a camera field of view; and causing to adjust a position and a shape of the first one or more reflective surfaces based at least on the processing of the image information and a position of a second one or more reflective surfaces with respect to the camera field of view.

* * * * *